United States Patent [19]
Furukawa

[11] Patent Number: 4,502,036
[45] Date of Patent: Feb. 26, 1985

[54] ENCODING AND DECODING SYSTEMS FOR BINARY DATA

[75] Inventor: Teruo Furukawa, Amagasaki, Japan

[73] Assignee: Mitsubishi Denki Kabushiki Kaisha, Chiyodaku, Japan

[21] Appl. No.: 355,548

[22] PCT Filed: Sep. 25, 1981

[86] PCT No.: PCT/JP81/00253
§ 371 Date: Feb. 17, 1982
§ 102(e) Date: Feb. 17, 1982

[87] PCT Pub. No.: WO83/01141
PCT Pub. Date: Mar. 31, 1983

[51] Int. Cl.³ .......................................... H03K 13/24
[52] U.S. Cl. .............................. 340/347 DD; 360/40
[58] Field of Search ................. 340/347 DD; 360/39, 360/40

[56] References Cited
U.S. PATENT DOCUMENTS
3,689,899  9/1972  Franaszer ................. 340/347 DD OTHER PUBLICATIONS
Horiguchi, "IEEE Transactions on Magnetics", vol. MAG-12, No. 6, Nov. 1976, pp. 740-442.
Miessler, "IBM Technical Disclosure Bulletin", vol. 17, No. 5, Oct. 1974, pp. 1489-1491.

Primary Examiner—Charles D. Miller
Attorney, Agent, or Firm—Wenderoth, Lind & Ponack

[57] ABSTRACT

An encoding system for converting first sequence of binary data into a second different sequence of binary data is arranged such that 4-bit data groups in a binary data sequence are converted to 6-bit data groups, and alternatively, 6-bit data groups are converted to 9-bit data groups whereby from one to seven code bits having a "0" value are arranged between any code bit having a '1' value in that converted code sequence and a code bit having a '1' value in the next code sequence.

2 Claims, 5 Drawing Figures

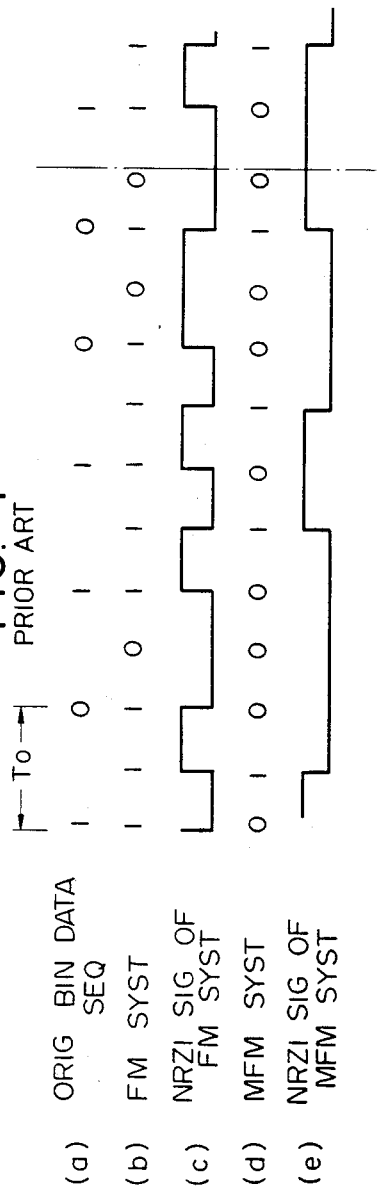
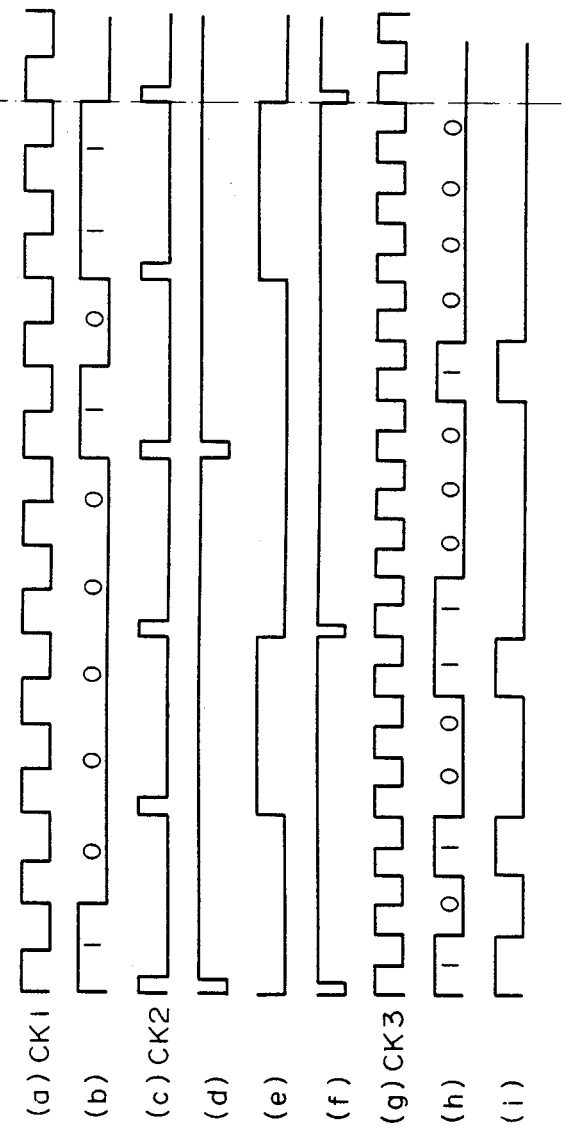

ENCODING AND DECODING SYSTEMS FOR BINARY DATA

BACKGROUND OF THE INVENTION

This invention relates to a binary code encoding system for converting a sequence of binary data to a sequence of binary codes suitable for recording the original binary data on a record medium such as a magnetic tape or a magnetic disc, and a decoding system for decoding and converting the sequence of converted binary codes upon reproducing it from the record medium.

In order to increase a recording density upon recording binary data on a record medium such as a magnetic tape or a magnetic disc, there are previously proposed and practiced various encoding systems.

FIGS. 1(a)–(e) are explanatory diagrams of one example of conventional encoding systems. FIG. 1(a) shows one example of a bit pattern of an original binary data sequence wherein numerals 0 and 1 express logic "0" and "1" respectively and $T_o$ indicates a bit interval. FIGS. (b) and (d) are one example of conventional encoding systems; FIG. (b) is called an FM system and FIG. (d) is called an MFM system (a modified FM system). A conversion algorithm of the FM system is to convert bits "1" and "0" in an original binary data sequence to "11" and "10" respectively. A conversion algorithm of the MFM system is to convert bits "1" and "0" in an original binary data sequence to "01" and "X0" respectively where "X" becomes a complement logic (1→0 or 0→1) of a code bit just preceding thereto.

Furthermore a sequence of codes converted according to each of the encoding systems is such that recording currents are generated and recorded on a record medium so as to cause an inversion of magnetization with bits of "1" but not to cause an inversion of magnetization with bits of "0". FIGS. 1(c) and (e) are waveforms of the recording currents (NRZI signals) for the code sequences encoded according to the FM system of the same FIG. (b) and the MFM system of the same FIG. (d) respectively.

In the case the recording is generally effected on a record medium, (a) if a spacing between the inversions of magnetization (a recording wavelength) is shortened, then magnetic transitions due to the leading and trailing inversions of magnetization interfere with each other so as to cause the generation of errors upon decoding a reproduced signal;

(b) even if a demodulation phase margin (Tw) (which will be described later) during the reproduction is small with respect to the spacing between the inversions of magnetization, the abovementioned errors are apt be caused; and (c) if the spacing between the inversions of magnetization is long as compared with a period of a demodulating clock signal produced from a reproduced signal, then the demodulating clock signal can not be accurately produced from the reproduced signal and the abovementioned errors are apt to be caused;

In general encoding systems, therefore, the undermentioned variables are given as the parameters indicating the ability including the three items (a), (b) and (c) as described above. Now, assuming that in some encoding system, a sequence of m-bit binary data is converted to a sequence of n-bit binary codes ($n \geq m$) and, between a code bit "1" selected at will from the code sequence after the conversion and a code bit "1" next developed, there exist code bits "0" whose number has a minimum of d and a maximum of k, the following expressions (1) to (4) hold:

$$T_{min}\left(\begin{array}{c}\text{spacing between}\\ \text{inversions of minimum}\\ \text{magnetization}\end{array}\right) = \frac{m}{n}(d+1)T_0 \quad (1)$$

$$T_{max}\left(\begin{array}{c}\text{spacing between}\\ \text{inversions of maximum}\\ \text{magnetization}\end{array}\right) = \frac{m}{n}(k+1)T_0 \quad (2)$$

$$C_{LK}\left(\begin{array}{c}\text{period of demodulating}\\ \text{clock signal}\end{array}\right) = \frac{m}{n}T_0 \text{ and} \quad (3)$$

$$T_W\left(\begin{array}{c}\text{demodulation}\\ \text{phase margin}\end{array}\right) = \frac{m}{n}T_0 \quad (4)$$

where $T_O$ is a period of the original data.

Accordingly, the foregoing description values of the expressions (1) and (4) are preferably larger (the abovementioned items (a) and (b)) and also the undermentioned ratio of the spacing between the inversions of maximum magnetization to the period of the demodulating clock signal (the expression (5)) is preferably smaller (the abovementioned item (c)).

$$\frac{T_{max}}{C_{LK}} = \frac{m}{n}(k+1)T_0 / \frac{m}{n}T_0 = k+1 \quad (5)$$

With respect to the FM system, the MFM system and the encoding system according to the present invention, the foregoing parameters are shown in the following first Table:

1ST TABLE

Table of Comparison of Parameters in Respective Encoding Systems

| Mod. System | Parameter | | | |
|---|---|---|---|---|
| | Spa. btwn. Invs. of Min. Magzn. | Demodg. Phase Marg. | Spa. btwn. Invs. of Max. Magzn./ Period Demodg. Clock Sig. | Spa. btwn. Invs. of Max. Magzn./ Spa. btwn. Invs. of Min. Magzn. |
| FM System | $0.5T_0$ | $0.5T_0$ | 4 | 2 |
| MFM System | $T_0$ | $0.5T_0$ | 4 | 4 |

1ST TABLE-continued

Table of Comparison of Parameters in Respective Encoding Systems

| Mod. System | Parameter | | | | |
|---|---|---|---|---|---|
| | Spa. btwn. Invs. of Min. Magzn. | Demodg. Phase Marg. | Spa. btwn. Invs. of Max. Magzn. | Spa. btwn. Invs. of Max. Magzn./ Period Demodg. Clock Sig. | Spa. btwn. Invs. of Max. Magzn./ Spa. btwn. Invs. of Min. Magzn. |
| System of This Invention | $1.33T_0 \left( = \frac{4}{3} T_0 \right)$ | $0.66T_0 \left( = \frac{2}{3} T_0 \right)$ | | 9 | 8 |

SUMMARY OF THE INVENTION

An encoding system according to the present invention divides a binary data sequence at intervals of four bits and converts those divided 4-bit data to predetermined 6-bit codes respectively when patterns of said 4-bit data correspond to any of thirteen predetermined types of patterns selected from the sixteen types of patterns consisting of four bits. However, when the patterns of said 4-bit data correspond to none of said thirteen types of patterns, it is divided into 6-bit data including 2-bit data following said 4-bit data and those divided 6-bit data are converted to predetermined 9-bit data respectively. Then, from not less than one to not greater than seven of code bits "0" are caused to exist between any code bit "1" in said converted code sequence and a code bit "1" next developed therein. The resetting encoding system is excellent in both spacing between inversions of minimum magnetization and demodulating phase margin over the FM and MFM systems as shown in the first Table and has the property that a demodulating clock signal can easily be derived from a reproduced signal. Also, the occurrence of errors can be reduced during the demodulation.

BRIEF DESCRIPTION OF THE DRAWINGS

FIG. 1 is an explanatory diagram of conventional encoding systems of the FM and MFM systems;

FIG. 3 is a timing chart for explaining the operation of the embodiment shown in FIG. 2;

DESCRIPTION OF THE PREFERRED EMBODIMENT

The present invention will be described in detail hereinafter in conjunction with the embodiments shown in the accompanying drawings. 2nd Table below is one concrete example of a conversion algorithm of the novel encoding system.

2ND TABLE

Table of Conversion Algorithm of Novel Encoding System
Conversion Table S1

| | Original Data | | Converted Code |
|---|---|---|---|
| S1 | 1100 | ·  · | X00000 |
| | 1101 | ·  · | X00001 |

2ND TABLE-continued

Table of Conversion Algorithm of Novel Encoding System
Conversion Table S1

| Original Data | | Converted Code |
|---|---|---|
| 1110 | ←  → | X00101 |
| 1111 | ←  → | 010101 |
| 1000 | ·  · | X01001 |
| 1001 | ·  · | 010001 |
| 1010 | ·  · | X00010 |
| 1011 | ·  · | X01010 |
| 0100 | ·  · | 010010 |
| 0101 | ←  → | X00100 |
| 0110 | ←  → | 010100 |
| 0111 | ←  → | X01000 |
| 0000 | ←  → | 010000 |

| | Conversion Table S2 | | |
|---|---|---|---|
| | Original Data | | Converted Code |
| S2 | 000100 | ·  · | X00010001 |
| | 000101 | ·  · | X00100001 |
| | 000110 | ·  · | X01000001 |
| | 000111 | ·  · | X01010001 |
| | 001000 | ·  · | 010000001 |
| | 001001 | ·  · | 010010001 |
| | 001010 | ·  · | 010100001 |
| | 001011 | ·  · | X00010000 |
| | 001100 | ·  · | X01010000 |
| | 001101 | ·  · | 010010000 |
| | 001110 | ·  · | X00100000 |
| | 001111 | ·  · | 010100000 |
| | | | X01000000 |

Here X is a complement logic (0X→01 and 1X→10) immediately before a code bit X in a converted code sequence.

The conversion algorithm first divides original data at intervals of four bits and converts the divided 4-bit data to 6-bit codes in accordance with the algorithm of the conversion table S1 of the 2nd Table when the patterns of said 4-bits data correspond to any of the thirteen types of patterns shown in the conversion table S1. However, when the patterns of the 4-bit data correspond to none of the thirteen types of patterns in the conversion table S1, the division is effected at intervals of six bits including 2-bit data following said 4-bit data and those divided 6-bit data are converted to 9-bit data in accordance with the conversion algorithm shown in the conversion table S2 of the second Table. Here a code bit X in a converted code sequence is a complement logic immediately before the same.

| X | Bit Immy Befe Code Bit X |
|---|---|
| 1 | 0 |
| 0 | 1 |

By observing the code sequences converted in accordance with the foregoing conversion algorithms, the parameters $m/n=4/6$ (or 6/9) and $d=1$ and $k=7$ are satisfied.

Figure 2:
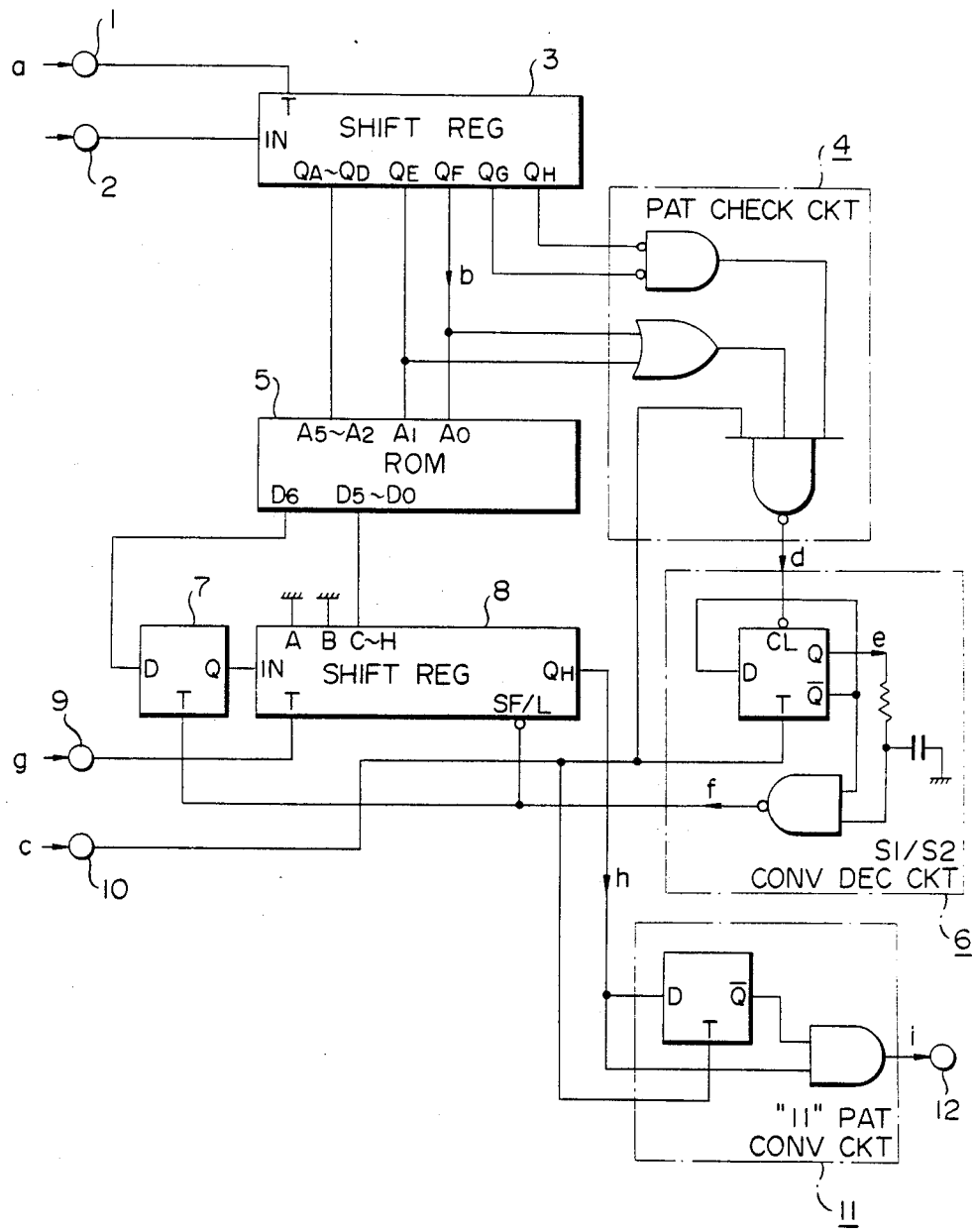
FIG. 2 is a block diagram of one embodiment to which the encoding system of the present invention is applied.

FIG. 2 is a block diagram of one embodiment to which an encoding system according to the present invention is applied and FIG. 3 is a timing chart for explaining the operation thereof. In FIG. 2 original data are entered into an input terminal (IN) of a shift register (serial in-parallel out) (3) through an input terminal (2). The shift register (3) also has a clock signal input to a terminal (T) thereof. The clock signal a (CK1) (FIG. 3(a)) is synchronized with a clock signal for the original data. The original entered data bits are delayed one bit at a time in the shift register (3) by the clock signal CK1 supplied to the terminal (T) and are delivered through data output terminals ($Q_A$ to $Q_H$). FIG. 3(b) shows a signal b delivered through the data output terminal ($Q_F$). Another clock signal C is input to an input terminal (10). The common clock signal c (CK2) (FIG. 3(c)) is input upon effecting the conversion S1 or S2 of the 2nd Tables. The common clock signal CK2 is a signal with a frequency equal to one half that of the clock signal for the original data. A clock signal g is also input to an input terminal (g). The clock signal g (CK3) (FIG. 3(g)) is synchronized with a converted code sequence (this will be described hereinafter). First the description will be made in conjunction with the process of subjecting the original entered data to the conversion S1 (or the conversion S2). Among outputs $Q_A$ to $Q_H$ from the shift register (3), the outputs $Q_E$ to $Q_H$ are entered into a pattern check circuit (4) where the pattern check is effected if a pattern preceeding, by four bits, the data to be converted corresponds to any of the thirteen types of the patterns in the conversion table S1. If it corresponds to any of the thirteen types of the patterns in the conversion table S1 and if it is in synchronization with the common clock signal CK2, then a checking signal d (FIG. 3(d)) is not delivered. On the contrary, if it does not correspond to any of the thirteen types of the patterns in the conversion table S1 and if it is in synchronization with the common clock signal CK2, then the checking signal is delivered. The common clock signal CK2 is supplied, in addition to the application to the pattern check circuit (4) from the input terminal (10) as described above, to an S1/S2 conversion decision circuit (6). That S1/S2 conversion decision circuit (6) halves the frequency of the common clock signal CK2 by a FLIP-FLOP disposed therein and accordingly produces a signal with a frequency equal to a quarter that of the clock signal CK1 but this frequency dividing FLIP-FLOP is cleared with the checking signal d from the pattern check circuit (4). By doing so, an output from the frequency dividing FLIP-FLOP, as shown in FIG. 3(e), results in a signal having a period CK1/4 with the conversion S1 effected but in a signal having a period CK1/6 with the conversion S2 effected and a signal f (FIG. 3(f)) of the output e from the frequency dividing FLIP-FLOP is delivered as an S1/S2 conversion decision signal. Then, the outputs $Q_A$ to $Q_F$ from the shift register (3) are entered into input terminals ($A_5$ to $A_0$) of an ROM (a read only memory, for example, Texas Instruments Part No. SN74A471N) (5) respectively and provided at its output terminals ($D_0$ to $D_6$) is an output pattern as unequivocally determined by input signals $A_0$ to $A_5$. Furthermore, it is assumed that the ROM has a conversion algorithm shown in the following third Table:

3RD TABLE

Algorithm of Converting ROM of Encoding System of This Invention

| Input Address | | | | | | Output Pattern | | | | | | |
|---|---|---|---|---|---|---|---|---|---|---|---|---|
| $A_0$ | $A_1$ | $A_2$ | $A_3$ | $A_4$ | $A_5$ | $D_0$ | $D_1$ | $D_2$ | $D_3$ | $D_4$ | $D_5$ | $D_6$ |
| 1 | 1 | 0 | 0 | Y | Y | 1 | 0 | 0 | 0 | 0 | 0 | Z |
| 1 | 1 | 0 | 1 | Y | Y | 1 | 0 | 0 | 0 | 0 | 1 | Z |
| 1 | 1 | 1 | 0 | Y | Y | 1 | 0 | 0 | 1 | 0 | 1 | Z |
| 1 | 1 | 1 | 1 | Y | Y | 0 | 1 | 0 | 1 | 0 | 1 | Z |
| 1 | 0 | 0 | 0 | Y | Y | 1 | 0 | 1 | 0 | 0 | 1 | Z |
| 1 | 0 | 0 | 1 | Y | Y | 0 | 1 | 0 | 0 | 0 | 1 | Z |
| 1 | 0 | 1 | 0 | Y | Y | 1 | 0 | 0 | 0 | 1 | 0 | Z |
| 1 | 0 | 1 | 1 | Y | Y | 1 | 0 | 1 | 0 | 1 | 0 | Z |
| 0 | 1 | 0 | 0 | Y | Y | 0 | 1 | 0 | 0 | 1 | 0 | Z |
| 0 | 1 | 0 | 1 | Y | Y | 1 | 0 | 0 | 1 | 0 | 0 | Z |
| 0 | 1 | 1 | 0 | Y | Y | 0 | 1 | 0 | 1 | 0 | 0 | Z |
| 0 | 1 | 1 | 1 | Y | Y | 1 | 0 | 1 | 0 | 0 | 0 | Z |
| 0 | 0 | 0 | 0 | Y | Y | 0 | 1 | 0 | 0 | 0 | 0 | Z |
| 0 | 0 | 0 | 1 | 0 | 0 | 1 | 0 | 0 | 0 | 1 | 0 | 1 |
| 0 | 0 | 0 | 1 | 0 | 1 | 1 | 0 | 0 | 1 | 0 | 0 | 1 |
| 0 | 0 | 0 | 1 | 1 | 0 | 1 | 0 | 1 | 0 | 0 | 0 | 1 |
| 0 | 0 | 0 | 1 | 1 | 1 | 1 | 0 | 1 | 0 | 1 | 0 | 1 |
| 0 | 0 | 1 | 0 | 0 | 0 | 0 | 1 | 0 | 0 | 0 | 0 | 1 |
| 0 | 0 | 1 | 0 | 0 | 1 | 0 | 1 | 0 | 0 | 1 | 0 | 1 |
| 0 | 0 | 1 | 0 | 1 | 0 | 0 | 1 | 0 | 1 | 0 | 0 | 1 |
| 0 | 0 | 1 | 0 | 1 | 1 | 1 | 0 | 0 | 0 | 1 | 0 | 0 |
| 0 | 0 | 1 | 1 | 0 | 0 | 1 | 0 | 1 | 0 | 1 | 0 | 0 |
| 0 | 0 | 1 | 1 | 0 | 1 | 0 | 1 | 0 | 0 | 1 | 0 | 0 |
| 0 | 0 | 1 | 1 | 1 | 0 | 1 | 0 | 0 | 1 | 0 | 0 | 0 |
| 0 | 0 | 1 | 1 | 1 | 1 | 0 | 1 | 0 | 1 | 0 | 0 | 0 | where YY: consists of combinations of four types of "11", "01", "10" and "00" and Z: may be a logic of either "1" or "0"

Among the converted output pattern, outputs $D_5$ to $D_0$ are entered into presetting terminals (C to H) of a shift register (parallel in-serial out) (8). Also an output $D_6$ is latched for a period of the S1/S2 conversion decision signal f by latching FLIP-FLOP (7) and entered into an input terminal (IN) of the shift register (8). By entering the S1/S2 conversion decision signal f into the shift register (8) at the input terminal (SF/L) for the shift load control, the abovementioned presetting signals are latched and codes of six converted bits (C to H) or nine converted bits (C to H, A to B and IN) are delivered, as a serial output signal h (FIG. 3(h)) through an output terminal ($Q_H$ by means of a clock signal CK3 supplied to a terminal (T)).

From this operation it will be understood that the pattern (1000) of the original data shown in FIG. 3(b) is converted to a code pattern (101001) shown in FIG. 3(h) and that a data pattern (001011) following the abovementioned pattern (1000) is converted to a code pattern (100010000). At that time the ROM has a conversion algorithm including all X values in the conversion tables S1 and S2 converted to logic '1'. Thus, the serial output signal h may have caused thereon two consecutive "1"s. In order to process this, the serial output signal h is converted to a normal signal i shown in FIG. 3(i) by a "11" pattern conversion circuit (11) for converting a "11" pattern to a "10" pattern after which it is delivered to an output terminal (12).

Figure 4:
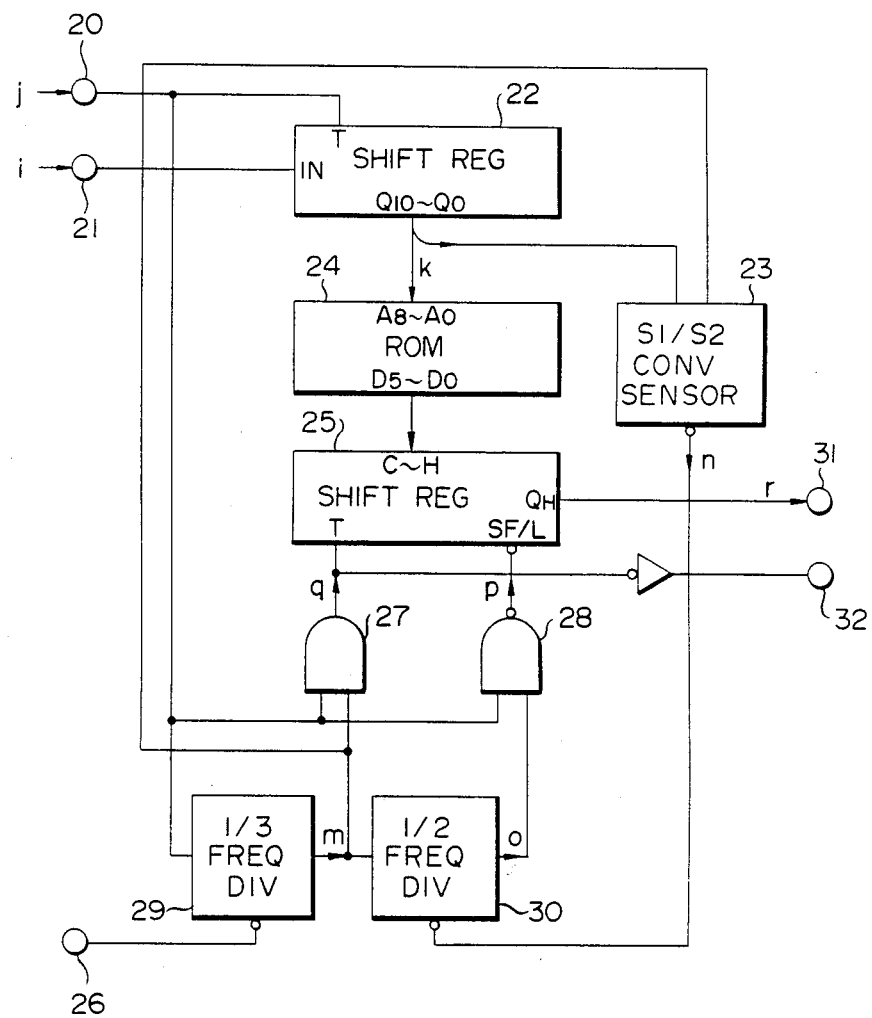
FIG. 4 is a block diagram of one embodiment to which the decoding system of the present invention is applied.
Figure 5:
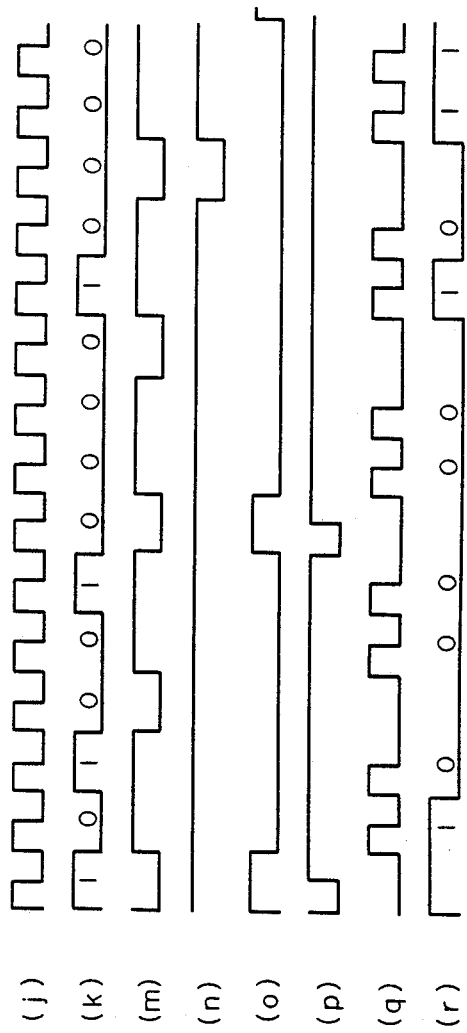
FIG. 5 is a timing chart for explaining the operation of the embodiment shown in FIG. 3.

Subsequently, FIG. 4 shows a block diagram of one embodiment to which the decoding system of the present invention is applied and FIG. 5 shows a timing chart for explaining the operation thereof. First, a converted code sequence i (FIG. 3(i)) is supplied to an input terminal (21) and a clock signal j (FIG. 5(j)) which is synchronized with the code sequence i is supplied to an input terminal (20). Then, as during the encoding, the converted code sequence is entered into a shift register (serial in-parallel out) (22) through its input terminal (IN) and is delayed one bit at a time in the shift register (22) by the clock signal j supplied to its terminal (T) and is delivered through output terminals ($Q_{10}$ to $Q_0$) of the shift register (22). (Assuming that $Q_0$ designates that output terminal through which a signal having the largest delay is delivered, the delay is progressively smaller in the order of $Q_1, \ldots, Q_{10}$.) It is now assumed that a signal k for a code sequence shown in FIG. 5(k) is being delivered to the output terminal $Q_2$. On the other hand, signals (nine lines) at the output terminals ($Q_2$ to $Q_{10}$) are entered into input terminals ($A_0$ to $A_8$) to an ROM (24) (Texas Instruments Part No. SN74S472N or the like), reversely converted within the ROM (24) by using a conversion algorithm reversed from that in the second table and entered, as decoded output signals on six lines, into presetting terminals (C to H) of a shift register (25) (parallel in-serial out) from output terminals ($D_0$ to $D_6$). On the other hand, the clock signal j is also supplied to a ⅓ frequency divider (29). This ⅓ frequency divider (29) is kept in synchronization by a synchronizing signal (not shown) fed into an input terminal (26) and generates a signal m (FIG. 5(m)) with a frequency equal to one third that of the signal j. This signal m is used as a decoding timing signal. Then, a ½ frequency divider (3) further frequency divides the signal m by two so as to generate a signal o with one sixth the frequency (FIG. 5(o)).

Subsequently, when three consecutive bits $Q_0$ to $Q_2$ are of a pattern "000" among signals $Q_0$ to $Q_{10}$ from the shift register (22) during a synchronized time interval of the ⅓ frequency divider (29), an S1/S2 conversion sensor circuit (23) generates an output signal n (FIG. 5(n)) which sets the polarity of an output from the ½ frequency divider (30). Through this operation, the output signal o from the ½ frequency divider (30) becomes a signal which has sensed the S1/S2 conversion. The latter signal is supplied to an NAND gate (28) along with the clock signal j. An output signal p (FIG. 5(p)) from that NAND gate (28) is supplied to a terminal (SF/L) of the shift register (25) so as to latch signals entered into the presetting terminals (C to H) thereof. Decoded data r (FIG. 5(r)) is delivered to an output terminal (31) through an output terminal ($Q_H$) of the shift register (25) by the reading clock signal q (FIG. 5(q)) having a period equal to ⅔ the time period of the clock signal j and is supplied to a terminal (T) of the shift register (25). It is possible to use, as the reading clock signal q, a clock signal next in synchronization by the clock signal j by a PLL or the like but the above-mentioned reading clock signal q is here obtained by gating the clock signal j with the output signal m from the ⅓ frequency divider (29) in an AND gate (27). Furthermore, this clock signal q is also delivered to a clock output terminal (32) after it has been inverted by an inverter. By observing that status in the timing chart of FIG. 5, it will be understood that patterns (101001) and (000010000) of an entered converted code sequence (=i) are decoded to the decoded data r (1000) and (001011) respectively.

Also, the conversion tables S1 and S2 for the encoding algorithms used for explaining the present invention are one concrete example of the present invention and other encoding algorithms may be used. More specifically, the specified thirteen types of 4-bit data pattern to be converted to 6-bit codes in the encoding system can first select any patterns among the sixteen types of patterns composed of four bits. Also, it is apparent that the correspondence to the selected patterns with 6-bit codes may be of any combination.

Then, there exist twelve types of 6-bit data patterns having the remaining unselected three types of 4-bit data pattern added with 2-bit data following the latter. Those twelve types of 6-bit data patterns are converted to 9-bit codes. Also, there exist thirteen types of those 9-bit patterns meeting the two requirements that from not less than one to not greater than seven of code bits "0" be present between a code bit "1" selected at will from the code sequence after the original data have been converted and a code bit "1" next developed therein and that the sixth to eighth code bits be of "0"'s respectively in order to sense the presence of patterns of the 9-bit codes during the decoding. The twelve types of 6-bit data may be of any combinations of twelve types selected at will from the thirteen types of 9-bit codes.

As described above, the encoding and decoding systems of the present invention have the excellent ability as a high density magnetic recording system as compared with other conventional modulation systems as shown in the first Table and become much simplified in a hardware construction. Therefore, its practical merit is very large.

What is claimed is:

1. A binary data encoding system for converting a first sequence of binary data into a second different converted sequence of binary data, said system comprising:

a means for converting respective data groups from said first sequence into corresponding 6-bit data groups of said second sequence when a 4-bit data group corresponds to any one of a predetermined set of thirteen 4-bit data groups according to the following table:

| Original Data | S1 | | Converted Code |
|---|---|---|---|
| 1100 | . | . | X00000 |
| 1101 | . | . | X00001 |
| 1110 | . | . | X00101 |
| 1111 | . | . | 010101 |
| 1000 | . | . | X01001 |
| 1001 | . | . | 010001 |
| 1010 | . | . | X00010 |
| 1011 | . | . | X01010 |
| 0100 | . | . | 010010 |
| 0101 | . | . | X00100 |
| 0110 | . | . | 010100 |
| 0111 | . | . | X01000 |
| 0000 | . | . | 010000 | wherein X is a complementary logic value of a code bit immediately preceding said code bit X in said converted sequence;

second means for converting 6-bit data groups from said first sequence into corresponding 9-bit data groups of said second sequence when said 4-bit data group does not correspond to any of said predetermined set of thirteen 4-bit data groups, said second converting means converting said 6-bit data groups according to the following table:

| S2 Original Data | Converted Code |
|---|---|
| 000100 | X00010001 |
| 000101 | X00100001 |
| 000110 | X01000001 |
| 000111 | X01010001 |
| 001000 | 010000001 |
| 001001 | 010010001 |
| 001010 | 010100001 |
| 001011 | X00010000 |
| 001100 | X01010000 |
| 001101 | 010010000 |
| 001110 | X00100000 |
| 001111 | 010100000 |
|  | X01000000 |

2. A binary data decoding system for converting a previously converted sequence of binary data into an original sequence of binary data, said system comprising:

a means for converting respective 6-bit data groups from said converted sequence into corresponding 4-bit data groups of said original data sequence when a 4-bit data group corresponds to any one of a predetermined set of thirteen 4-bit data groups according to the following table:

| | Original Data | Converted Code |
|---|---|---|
| S1 | 1100 | X00000 |
| | 1101 | X00001 |
| | 1110 | X00101 |
| | 1111 | 010101 |
| | 1000 | X01001 |

| Original Data | Converted Code |
|---|---|
| 1001 | 010001 |
| 1010 | X00010 |
| 1011 | X01010 |
| 0100 | 010010 |
| 0101 | X00100 |
| 0110 | 010100 |
| 0111 | X01000 |
| 0000 | 010000 | wherein X is a complementary logic value of a code bit immediately preceding said code bit X in said converted sequence;

second means for converting 9-bit data groups from said converted sequence into 6-bit data groups from said original sequence when said 4-bit data group does not correspond to any of said predetermined set of thirteen 4-bit data groups, said second converting means converting said data groups according to the following table:

| | Original Data | Converted Code |
|---|---|---|
| S2 | 000100 | X00010001 |
| | 000101 | X00100001 |
| | 000110 | X01000001 |
| | 000111 | X01010001 |
| | 001000 | 010000001 |
| | 001001 | 010010001 |
| | 001010 | 010100001 |
| | 001011 | X00010000 |
| | 001100 | X01010000 |
| | 001101 | 010010000 |
| | 001110 | X00100000 |
| | 001111 | 010100000 |
| | | X01000000 |

* * * * *